United States Patent
Ahrens et al.

(10) Patent No.: US 9,790,117 B2
(45) Date of Patent: Oct. 17, 2017

(54) METHODS FOR MAKING A GLASS MATERIAL AND APPARATUS

(75) Inventors: Jeffrey H Ahrens, Pine City, NY (US); Charles M Carter, Danville, KY (US); Jonghak Kim, Corning, NY (US)

(73) Assignee: Corning Incorporated, Corning, NY (US)

( * ) Notice: Subject to any disclaimer, the term of this patent is extended or adjusted under 35 U.S.C. 154(b) by 1215 days.

(21) Appl. No.: 12/511,306

(22) Filed: Jul. 29, 2009

(65) Prior Publication Data

US 2011/0023544 A1 Feb. 3, 2011

(51) Int. Cl.
C03B 5/26 (2006.01)
C03B 5/24 (2006.01)

(52) U.S. Cl.
CPC .................................. *C03B 5/245* (2013.01)

(58) Field of Classification Search
CPC .................................................... C03B 5/245
USPC ................... 700/33, 41, 42, 44, 46, 52, 157; 65/29.17, 380
See application file for complete search history.

(56) References Cited

U.S. PATENT DOCUMENTS

| | | | |
|---|---|---|---|
| 3,244,494 A | | 4/1966 | Apple et al. |
| 4,011,070 A | * | 3/1977 | Hynd ........................... 65/29.17 |
| 4,090,241 A | * | 5/1978 | Houston ........................ 700/117 |
| 5,341,307 A | | 8/1994 | Myhre et al. |
| 6,168,305 B1 | * | 1/2001 | Marmsater ..................... 700/240 |
| 7,840,500 B2 | * | 11/2010 | Khanbaghi ......................... 706/4 |
| 2006/0230787 A1 | | 10/2006 | Lehman et al. |

(Continued)

FOREIGN PATENT DOCUMENTS

| | | |
|---|---|---|
| CN | 1543442 A | 11/2004 |
| CN | 201990588 | 9/2011 |
| JP | 1980126539 | 9/1980 |

(Continued)

OTHER PUBLICATIONS

PR448 Feed Rate Controller. Datasheet [online]. Practicon Products [retrieved on Sep. 26, 2011]. Retrieved from the Internet: <URL: http://www.practicon.co.uk/datasheets/PR448.pdf>.*

(Continued)

*Primary Examiner* — Michael H Wilson
*Assistant Examiner* — Yana B Krinker
(74) *Attorney, Agent, or Firm* — Matthew J. Mason; Stephen S. Wentsler (57) ABSTRACT

Methods and apparatus for making a glass material are provided. The apparatus comprises a level sensor configured to measure a level of molten glass within a glass melter, a level controller operatively connected to the level sensor, a batch material sensor configured to measure a characteristic of a quantity of batch material, an estimator operatively connected to the batch material sensor, a batch fill rate controller configured to calculate a speed command, and a batch delivery device configured to fill the glass melter. The methods comprise the steps of controlling an actual batch fill rate of batch material entering the glass melter. The step of controlling further comprises estimating a batch fill rate of batch material entering the glass melter, and controlling the actual batch fill rate based on a comparison between a predetermined batch fill rate and the estimated batch fill rate.

19 Claims, 3 Drawing Sheets

(56) References Cited

U.S. PATENT DOCUMENTS

2008/0133433 A1   6/2008   Khanbaghi ................. 706/4
2011/0023544 A1   2/2011   Ahrens et al.

FOREIGN PATENT DOCUMENTS

JP   1984120522   9/1981
JP   1995330342   12/1995

OTHER PUBLICATIONS

PD6210 & PD6310 ProVu Batch Controllers. Datasheet [online]. Precision Digital [retrieved on Sep. 26, 2011]. Retrieved from the Internet: <URL: http://www.predig.com/PD6210/index.php>.*
R. Haber, et al., *Identification and Adaptive Control of a Glass Furnace*, Automatica, vol. 17, No. 1, pp. 175-185 (1981).
H. Zhang, et al. *Identification and Control of a Large Kinescope Glass Furnace*, Automatica, vol. 30, No. 5, pp. 887-892 (1994).
T.K. Madhubala, et al. *Development and Tuning of Fuzzy Controller for a Conical Level System*, Proceeding of the ICISIP, pp. 450-455 (2004).
Gordon S. Black, Jr., *Control Technology Applied to Glass Level Regulation*, IEEE Transactions on Industry Applications, vol. 26, No. 1, pp. 183-188, Jan./Feb. 1990.
B.A. Ogunnaike and W.H. Ray, "Process Dynamics, Modeling, and Control", Oxford University Press, 1994.
CN201010272920.0 Office Action dated Sep. 20, 2012.
CN201410242317.6 Office Action dated Sep. 28, 2015.
JP2010170213 Office Action dated May 20, 2014.
TW099124954 Search Report dated Aug. 1, 2014.

* cited by examiner

METHODS FOR MAKING A GLASS MATERIAL AND APPARATUS

TECHNICAL FIELD

The present invention relates generally to methods for making a glass material and apparatus, and more particularly, to apparatus and methods of controlling an actual batch fill rate of batch material entering a glass melter.

BACKGROUND

Methods and apparatus for making glass material typically include introducing batch material into a glass melter for producing a quantity of molten glass. The molten glass can thereafter be formed into glass sheets. Various process techniques may be adjusted to impact the efficiency of the process and/or characteristics of the formed glass sheets.

SUMMARY

The following presents a simplified summary of the disclosure in order to provide a basic understanding of some example aspects described in the detailed description.

In one example aspect, a method of making a glass material is provided. The method comprises the step of controlling an actual batch fill rate of batch material entering a glass melter. The step of controlling further comprises the steps of estimating a batch fill rate of batch material entering the glass melter, and controlling the actual batch fill rate based on a comparison between a predetermined batch fill rate and the estimated batch fill rate.

In another example aspect, a method of controlling a level of molten glass within a glass melter is provided. The method comprises the steps of monitoring a level of molten glass within the glass melter, calculating a predetermined batch fill rate for the glass melter based on a difference between a predetermined level of molten glass and the monitored level of molten glass, estimating a batch fill rate of batch material entering the glass melter by determining a characteristic change in a quantity of batch material over time; and controlling an actual batch fill rate of batch material entering the glass melter based on a comparison between the predetermined batch fill rate and the estimated batch fill rate.

In yet another example aspect, a glass melter is provided. The glass melter comprises a level sensor configured to measure a level of molten glass within the glass melter and a level controller operatively connected to the level sensor. The level controller is configured to calculate a predetermined batch fill rate for the glass melter based on a difference between a predetermined level of molten glass and a level of molten glass monitored by the level sensor. The glass melter also comprises a batch material sensor configured to measure a characteristic of a quantity of batch material, and an estimator operatively connected to the batch material sensor. The estimator is configured to receive information from the batch material sensor to estimate a batch fill rate of batch material entering the glass melter. The glass melter further comprises a batch fill rate controller configured to calculate a speed command based on a difference between a predetermined batch fill rate from the level controller and an estimated batch fill rate from the estimator, and a batch delivery device configured to fill the glass melter with batch material at an actual batch material fill rate in response to a speed command from the batch fill rate controller.

BRIEF DESCRIPTION OF THE DRAWINGS

These and other aspects are better understood when the following detailed description is read with reference to the accompanying drawings, in which.

DETAILED DESCRIPTION

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

Figure 1:
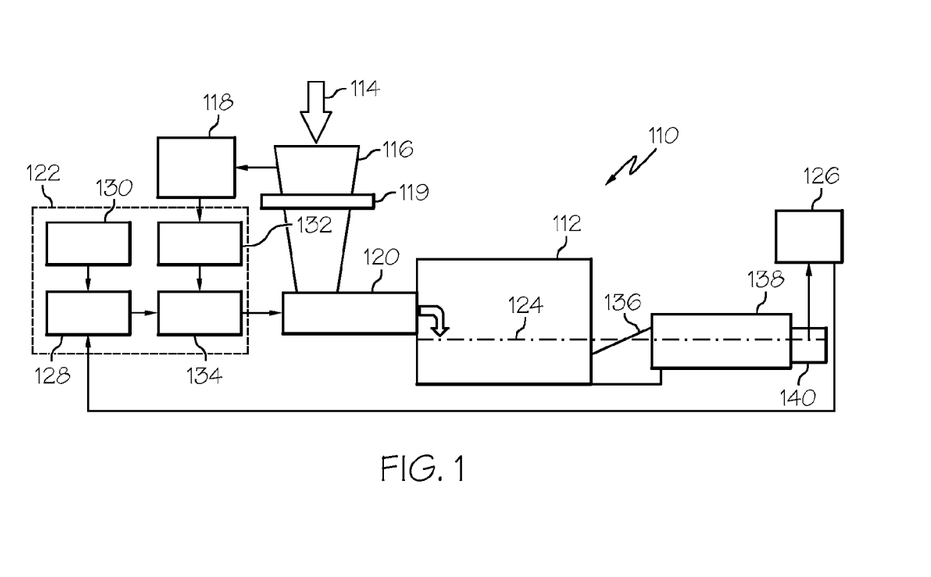
FIG. 1 is a schematic view of an apparatus for making a glass material.

FIG. 1 illustrates a schematic view of an apparatus 110 for making a glass material. The apparatus 110 can include a glass melter 112 configured to receive batch material 114 from a holding bin 116. A batch material sensor 118 including a load cell 119 can be connected to the holding bin 116 and configured to measure one or more characteristics of a quantity of batch material 114 in the holding bin 116. The batch material 114 in the holding bin 116 can be introduced to the glass melter 112 by a batch delivery device 120 at an actual batch fill rate. The batch delivery device 120 can include a variety of mechanical devices (e.g., screw feeders, conveyors) configured to transport batch material 114 from the holding bin 116 to the glass melter 112. A controller 122 can also be provided to operate the batch delivery device 120. Once batch material is introduced, the glass melter 112 can apply heat to reduce the batch material 114 to produce a quantity of molten glass 124. A level sensor 126 can be configured to measure the level of the molten glass 124 within a portion of the apparatus 110. As shown, the level sensor 126 can be connected to a second connecting tube 140 although the level sensor 126 can be connected to other portions of the apparatus 110 in further examples.

As shown in FIG. 1, the controller 122 can include a level controller 128, a unit 130 for providing a predetermined level of molten glass, an estimator 132, and a batch fill rate controller 134. The level controller 128 can be operatively connected to the level sensor 126 and the unit 130 for providing a predetermined level of molten glass. The level controller 128 is configured to calculate a predetermined batch fill rate for the glass melter 112 based on a difference between the predetermined level of molten glass provided by the unit 130 and a level of molten glass 124 monitored by the level sensor 126. The predetermined level of molten glass can be provided as a constant or a variable in the way of calculation by mathematic equations, prediction by previous experience, search from lookup tables, or the like. Moreover, the batch fill rate controller 134 can be operatively connected to the level controller 128, the estimator 132, and the batch delivery device 120. The batch fill rate controller 134 is configured to calculate a speed command for the batch delivery device 120 based on a difference between the predetermined batch fill rate from the level controller 128 and an estimated batch fill rate from the estimator 132. The estimator 132 can be operatively connected to the batch material sensor 118 and the batch fill rate controller 134, and is configured to receive information from the batch material sensor 118 to estimate the batch fill rate of batch material 114 entering the glass melter 112. Various information of the batch material 114 can be received by the estimator 132 such as the weight, mass, volume, level, density, and other characteristics in a quantity of batch material 114 within the holding bin 116.

The controller 122 can be an electronic controller and can include a processor. The controller 122 can include one or more of a microprocessor, a microcontroller, a digital signal processor (DSP), an application specific integrated circuit (ASIC), a field-programmable gate array (FPGA), discrete logic circuitry, or the like. The controller 122 can further include memory and can store program instructions that cause the controller 122 to provide the functionality ascribed to it herein. The memory can include one or more volatile, non-volatile, magnetic, optical, or electrical media, such as read-only memory (ROM), random access memory (RAM), electrically-erasable programmable ROM (EEPROM), flash memory, or the like. The controller 122 can further include one or more analog-to-digital (A/D) converters for processing various analog inputs to the controller. It will be apparent to those skilled in the art that various modifications and variations can be made without departing from the spirit and scope of the claimed invention.

The apparatus 110 can further include one or more of a first connecting tube 136, a finer 138 (e.g., finer tube), and a second connecting tube 140. The first connecting tube 136 can provide fluid communication between the glass melter 112 and the finer 138. The second connecting tube 140 can provide fluid communication between the finer 138 and other downstream components (not shown).

Figure 2:
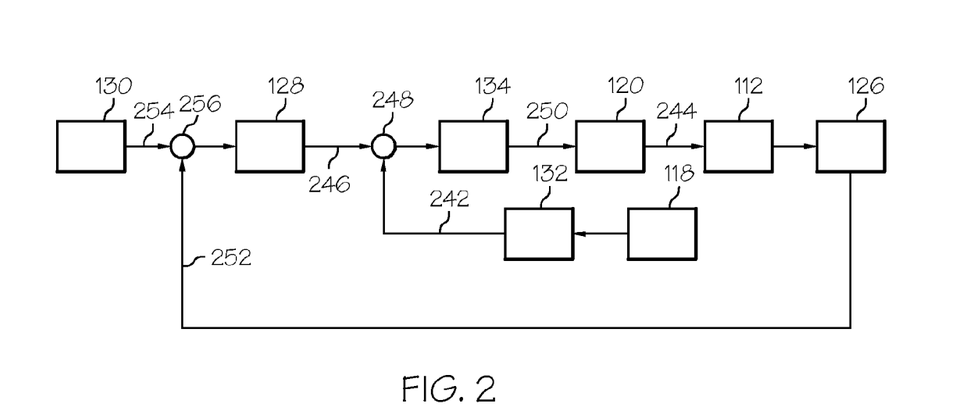
FIG. 2 is a schematic illustrative process for controlling an actual batch fill rate of batch material entering a glass melter.

Example methods of making glass with the apparatus 110 will now be described. Referring to FIG. 2, one example method comprises the steps of estimating a batch fill rate 242 of batch material 114 entering the glass melter 112 by the estimator 132, and controlling the actual batch fill rate 244 based on a comparison between a predetermined batch fill rate 246 and the estimated batch fill rate 242 by the batch fill rate controller 134.

As shown in FIG. 2, a first summer 248 receives both the predetermined batch fill rate 246 and the estimated batch fill rate 242 and determines the difference between them. The difference is then sent to the batch fill rate controller 134 to calculate the speed command 250 for operating the batch delivery device 120. In an example embodiment, any close-loop control that drives the difference between predetermined batch fill rate 246 and the estimated batch fill rate 242 to zero, or close to it, can be used by the batch fill rate controller 134. Example close-loop control techniques include proportional-integral (PI) control, proportional-integral-derivative (PID) control, and the like. An example close-loop control technique balances simplicity with performance is the PI control.

If the actual batch fill rate 244 entering the glass melter 112 is kept close to a molten glass pull rate coming out of the finer 138, then the level of the molten glass 124 will be held relatively constant. The level of the molten glass 124 response (Level) can be modeled as proportional to the integral of the difference between the actual batch fill rate 244 and molten glass pull rate as shown in the following format:

$$\text{Level} = k_m \int (\text{fill rate}(t) - \text{pull rate}(t)) dt \qquad (1)$$

where $k_m$ is a constant of proportionality (or the process gain) which is inversely proportional to the surface area of the melting tanks (e.g. the glass melter 112 and the finer 138). This relationship is clear since an actual batch fill rate 244 that is higher or lower than the corresponding molten glass pull rate will correspondingly accumulate or reduce the mass of the molten glass in the glass melter 112 and the finer 138. Therefore, the level of molten glass 124 can be adjusted up or down by moving the actual batch fill rate 244 up or down over an appropriate period of time and then returning the actual batch fill rate 244 to match the molten glass pull rate.

It is noted that there may be other disturbances not compensated for by batch fill rate control that can impact the level of molten glass 124, such as pressure and temperature variation in the glass melter 112. It may therefore be advantageous to adjust the predetermined batch fill rate 246 to achieve a stable level of molten glass 124. Referring to FIG. 2, the level controller 128 can be used to determine how the predetermined batch fill rate 246 should be adjusted based on the difference between a monitored level 252 and a predetermined level 254 of molten glass 124. A second summer 256 receives both the monitored level 252 and a predetermined level 254 of molten glass 124 and determines the difference between them. The difference is then sent to the level controller 128 to adjust the predetermined batch fill rate 246. This cascade control configuration has both a batch fill rate compensation on the inner control loop and a level of molten glass compensation on the outer control loop. In an example embodiment, any close-loop control that drives the difference between the monitored level 252 and predetermined level 254 of molten glass 124 to zero, or close to it, may be used by the level controller 128. Example close-loop control techniques include PI control, PID control, and the like. An example close-loop control technique balancing simplicity with performance is the PI control.

In following example embodiments, the PI control for the batch fill rate controller 134 and the level controller 128 is designed by selecting the PI gains (i.e. proportional gain and integral gain) based on a variation of an internal model approach, which is useful for guaranteeing the closed-loop stability. The variation can include information about the fill rate variation to try and balance the tradeoff between closed-loop stability and disturbance rejection.

In an example embodiment, the PI gains for the batch fill rate controller 134 (i.e. inner control loop) are determined by considering the fill rate variation (i.e. disturbance d). The controller design can be based on a model of the process, in particular, using a process gain ($k_g$) from the speed command 250 to the actual batch fill rate 244, time constant ($\tau$) of the actual batch fill rate response, and delay time ($\theta$) between the speed command 250 and the actual batch fill rate 244. These values can be determined from the process based on historical data, or for example from a step test. The controller design also uses the frequency response characteristic of the disturbances. The highest frequency ($\omega$) of interest of the disturbance d is selected by examining the frequency response of these disturbances obtained from process data. The desired amount of disturbance attenuation ($a_d$) is selected as well. This value is selected in the range of $0 < a_d < 1$, where 0 corresponds to zero percent attenuation while 1 corresponds to 100 percent. The proportional gain $k_p$ and integral gain $k_i$ are calculated using the following formula:

$$k_p = \frac{1}{k_g}\left(\frac{-}{+T_c}\right) \quad (2)$$

$$k_i = \frac{k_p}{\tau} \quad (3)$$

where $T_c$ is the desired closed-loop time constant.

The desired closed-loop time constant $T_c$ is determined by selecting a value (factor) that indicates the aggressiveness of the control action. The value factor can be chosen from the range of 1≤factor≤100, where a value of 1 is considered aggressive tuning and 100 is considered conservative tuning. Aggressive tuning generally provides a better disturbance rejection, but at the expense of reduced closed-loop stability margins and potential for amplification of actual batch fill rate calculation error. Conservative tuning will have the opposite effect; thus there is a tradeoff in the tuning selection. In one example, the factor has a value of 10. Once the factor value is selected, the desired closed-loop time constant is $T_c$ chosen by using the following logical statement:

If factor ≥ 10  (4)
Then $T_c = \max\{\text{factor} \times 0.8 \times, \text{factor} \times 0.1 \times -\}$
and If factor < 10  (5)
Then
$T_c = \max\left\{\frac{r_d}{\ldots(1-r_d^2)^{0.5}}, \text{factor} \times 0.8 \times, \text{factor} \times 0.1 \times -\right\}$ where $r_d = 1 - a_d$. In one example, to balance disturbance rejection with closed-loop stability, the disturbance attenuation $a_d$ is 0.9 and $r_d$ is 0.1.

In another example embodiment, the PI gains for the level controller 128 (i.e. outer control loop) are determined based on the inner control loop bandwidth and the model of the level response given in equation (1), specifically, the constant of proportionality (or the process gain) $k_m$. The inner control loop bandwidth is the bandwidth of the transfer function ($B_i$) from the predetermined batch fill rate 246 to the estimated batch fill rate 242. This is defined as the frequency (rad/s) where the transfer function $B_i$ is −3 dB below the d.c. value. The proportional gain ($k_{po}$) of the level controller 128 is chosen to initially set the outer control loop bandwidth to be 5 to 10 times smaller than the inner control loop bandwidth. It is calculated using the following formula:

$$k_{po} = \frac{B_i}{k_m}, 5 \leq \ \leq 10 \quad (6)$$

where $\chi$ is a constant. When $\chi=10$, it emphasizes stability over aggressive performance, while a choice of $\chi=5$ would give more aggressive outer loop control.

The integral gain ($k_{io}$) of the level controller 128 is designed to avoid closed-loop oscillation, and is calculated using the following formula:

$$k_{io} < \frac{k_{po}^2 k_m}{4} \quad (7)$$

The integral gain $k_{io}$ of the level controller 128 will in general increase the outer-loop bandwidth. The outer-loop bandwidth can be calculated numerically and if the resulting value is determined to be too large relative to the inner-loop bandwidth, the parameter $\chi$ can be increased and the gains $k_{po}$ and $k_{io}$ can be recalculated. In one example, an outer-loop bandwidth is close to the value chosen above when $$k_{io} = \frac{k_{po}^2 k_m}{12} \quad (8)$$

In addition, online process tuning can be conducted by adjusting the design parameters $r_d$, $\chi$, or factor as appropriate. If the above-mentioned values of the parameters $r_d$ and $\chi$ are used, then the PI gains for the batch fill rate controller 134 and level controller 128 can be selected and tuned by simply choosing the value factor.

To implement the close-loop control of the batch fill rate, real-time batch fill rate information is needed for feedback. The actual batch fill rate 244 can be measured by any sensor that directly measures the rate of the batch material 114 entering the glass melter 112. Alternatively, the actual batch fill rate 244 entering the glass melter 112 should correspond to the loss-in-bin weight over time; thus, the batch fill rate can be estimated by characteristics change in a quantity of batch material 114 over time. The characteristics change can include change of the weight, mass, volume, level, density in a quantity of batch material 114, or the like.

Figure 3:
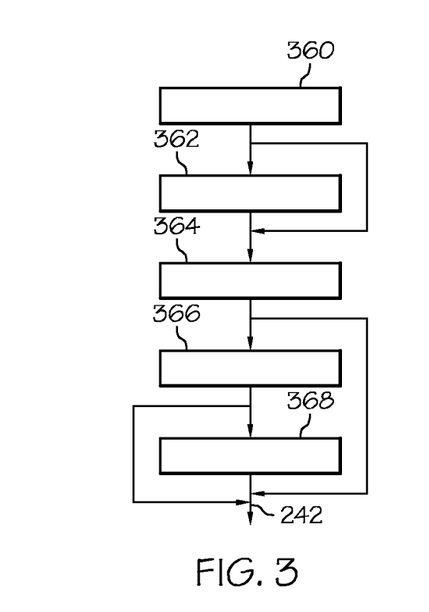
FIG. 3 is a schematic illustrative process for estimating a batch fill rate of batch material entering the glass melter.

In an example embodiment, the estimated batch fill rate 242 is determined by an algorithm as shown in FIG. 3. In step 360 a characteristic of a quantity of the batch material can be received such as the weight, mass, volume, level, density, or other characteristics. In one example, one or more batch material sensors 118 can include one or more load cells 119 configured to measure the weight of each holding bin and that weight may be sampled at an appropriate rate (e.g. 1 second). The bin weight data can be filtered to remove high-frequency noise at step 362 prior to step 364, or can be directly sent to step 364 without filtering. At step 364, the rate of change of the bin weight can be calculated by any numerical differentiation technique. The rate of weight change calculated at step 364 can be directly used as the estimated batch fill rate 242, or can be filtered again at step 368. Since batch fill rate estimation is based on bin weight loss, the most accurate batch fill rate estimation will be obtained when the batch material 114 is removed from the holding bin 116 while batch material 114 is not simultaneously entered into the holding bin 116. During this condition, the resulting rate of weight change will be negative and correspond to the rate at which batch material 114 is removed from the holding bin 116. The negative of the resulting sequence of data corresponds to the estimated batch fill rate 242 entering the glass melter 112 from a holding bin 116. In case there are more than one holding bins, the sum of the batch fill rates calculated from each bin weight is the total estimated batch fill rate.

It is possible that the bin weight can shift during the estimation from an abrupt disturbance. For example, additional batch material 114 may be added at the same time that the bin weight change is calculated. In that case, the weight change may be positive or in general may not correspond to the rate of removal. Under this condition, the resulting batch fill rate estimation would be inaccurate and would likely be counter productive for feedback control. Therefore, alternatively, it may be advantageous to compensate at step 366 for the additional batch material when determining the weight change over the period of time. Compensating the bin weight shift from an abrupt disturbance can be achieved using various methods. For example, the adding of additional batch material 114 during the time of estimating the batch fill rate can be compensated by subtracting a weight of the additional batch material.

Figure 4:
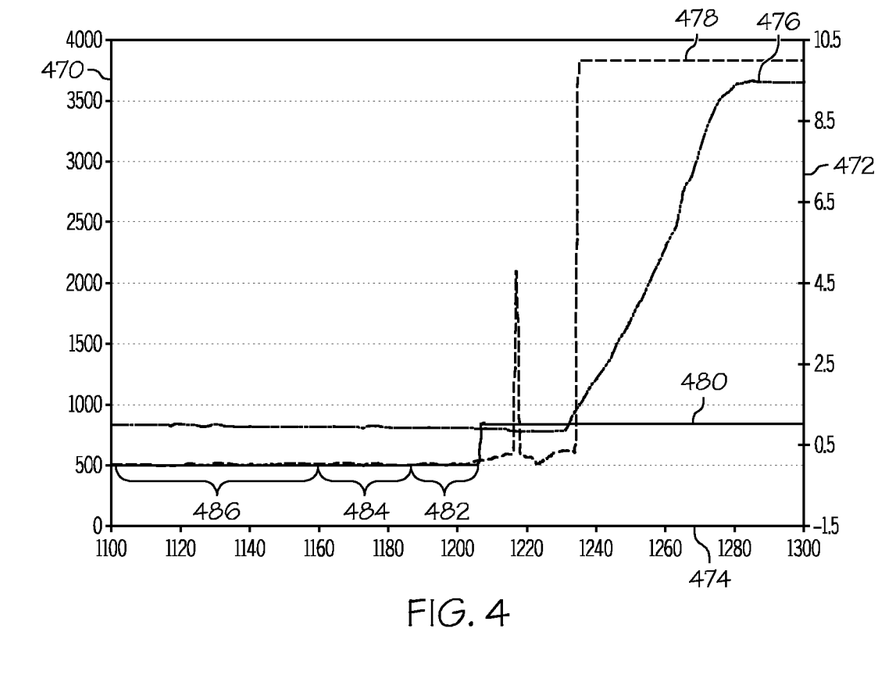
FIG. 4 illustrates an example of detecting the event of adding additional batch material to the quantity of batch material over a period of time.

In another example, the batch fill rate can be compensated by substantially masking the additional batch material with historical weight change data. For instance, FIG. 4 provides an example of detecting the event of adding additional batch material 114 to the holding bin 116. In FIG. 4, the left Y-axis 470 represents the weight with the unit of pounds; the right Y-axis 472 represents the level of the batch material 114 in the holding bin 116 with the unit of inches; and the X-axis 474 represents the time with the unit of seconds. The first curve 476 is the bin weight data that shows the large increase in weight during the additional batching material adding. The weight increase produces a spike in the second curve 478, which is the bin weight change deviation. When this spike exceeds a predetermined threshold value, it triggers an alarm presented as the third curve 480. A batch fill rate value based on an average of historical data can be used to mask the loss-in-bin weight data throughout the duration of the alarm (typically 5 minutes). This average is calculated by taking the mean of a certain length of data that is offset from the time the alarm was triggered as shown in FIG. 4. For example, with a sample time of 1 second, an offset 482 of 15 samples, an average offset 484 of 20 samples, and an average length 486 of 50 samples, the average value would be equal to the mean of the samples starting 85 seconds before the alarm to 35 seconds before the alarm. Therefore, the batch fill rate calculation must be delayed by a number of samples equal to the offset 482 plus the average offset 484. This delay is required to anticipate bin weight shift and is generally very short compared with process time constants.

Figure 5:
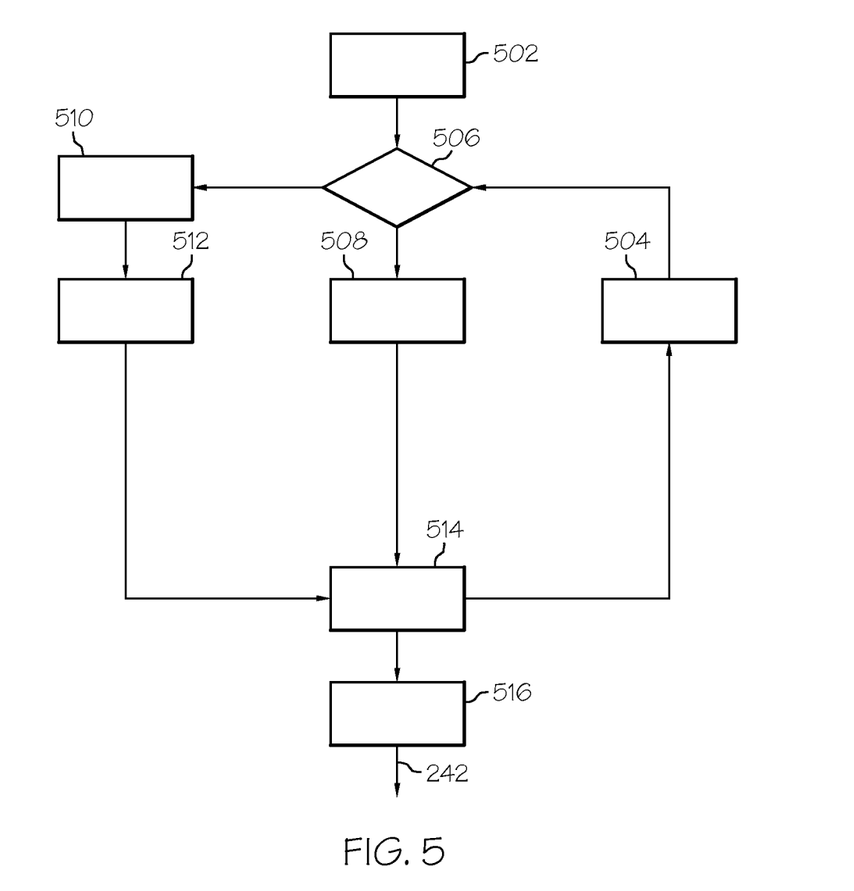
FIG. 5 a schematic illustrative process of one example for estimating a batch fill rate of batch material entering the glass melter.

Referring to FIG. 5, an example embodiment of estimating the batch fill rate of batch material 114 entering the glass melter 112 is presented.

The method starts with the bin weight data sampled every T seconds. This data may be filtered before or after sampling. The bin weight data at the sample instants kT, where k=0,1,2, . . . , is represented as BW(k). The weight change $\Delta BW(k)$ at the sample instants is given by the following formula at step 502:

$$\Delta BW(k) = \frac{BW(k) - BW(k-1)}{T} \qquad (9)$$

A running average of weight change $\Delta BW_{avg}(k)$, delayed by $k_{offset}+k_{avg\_offset}$ number of samples, is calculated by buffering $k_{avg\_len}$ number of samples (average length 486) as shown in FIG. 4. The calculation is using the following formula at step 504:

$$\Delta BW_{avg}(k) = \frac{1}{k_{avg\_len}} \sum_{j=0}^{k_{avg\_len}} \Delta BW_{filt}^{mod}\left(\frac{k - k_{offset} -}{k_{avg\_offset} - j}\right) \qquad (10)$$

where $\Delta BW_{fit}^{mod}(k)$ is the filtered modified weight change that is calculated by equation (14) at step 514. Equation (10) can be initialized by using historical data or using zeros for the filtered modified weight change $\Delta BW_{fit}^{mod}(k)$. The $k_{offset}$ value is set to allow enough samples to detect the bin weight shift. As shown in FIG. 4, the $k_{avg\_offset}$ determines when to start the averaging, and $k_{avg\_len}$ determines the number of samples that are averaged. Example values for these parameters are $k_{offset}$=15, $k_{avg\_offset}$=20, and $k_{avg\_offset}$=50.

The step 506 detects any abrupt bin weight shift, such as adding additional batch material 114, at each sample point by comparing the weight change deviation, which is given by the following formula:

$$\|\Delta BW(k)\| - \|\Delta BW_{avg}(k)\| \geq \Delta BW_{threshold} \qquad (11)$$

where $\Delta BW_{threshold}$ is a constant threshold value. The threshold value can be determined by examining process data to quantify the weight change deviation during abrupt bin weight shift. In one example, the threshold value is 0.2.

If conditional relationship of equation (11) is FALSE, then the unfiltered modified weight change $\Delta BW^{mod}(k)$ is set equal to the weight change delayed by $k_{offset}$, as calculated using the following formula at step 508:

$$\Delta BW^{mod}(k) = \Delta BW(k - k_{offset}) \qquad (12)$$

$$= \frac{BW(k - k_{offset}) - BW(k - k_{offset} - 1)}{T}$$

If this conditional relationship of equation (11) becomes TRUE, then the method goes to step 510 of a transition from FALSE to TRUE for a period of time set by a timer. The period of transition is referred to as the alarm period set by the timer, and can be, for example, 5 minutes long.

During alarm period set by the timer at step 510, the unfiltered modified weight change $\Delta BW^{mod}(k)$ is calculated using the following formula at step 512:

$$\Delta BW^{mod}(k) = \Delta BW_{avg}(k - k_{offset}) \qquad (13)$$

where the average of weight change $\Delta BW_{avg}(k)$ is delay by samples $k_{offset}$.

A low pass filter is used at the step 514 to filter the unfiltered modified weight change $\Delta BW^{mod}(k)$ using the following discrete-time filter:

$$\Delta BW_{filt}^{mod}(k) = -b_1 \Delta BW_{filt}^{mod}(k-1) - b_2 \Delta BW_{filt}^{mod}(k-2) + \qquad (14)$$
$$a_1 \Delta BW^{mod}(k) + a_2 \Delta BW^{mod}(k-1) + a_3 \Delta BW^{mod}(k-2)$$

where $$a_1 = a_3 = \frac{_2 T^2}{4^2 + 2_1 T + _2 T^2}$$

$$a_2 = 2a_1$$

$$b_1 = \frac{2_2 T^2 - 8^2}{4^2 + 2_1 T + _2 T^2}$$

$$b_2 = \frac{4^2 - 2_1 T + _2 T^2}{4^2 + 2_1 T + _2 T^2}$$

The parameter $\epsilon$ sets the filter bandwidth and $\alpha_1$ and $\alpha_2$ set the shape of the frequency response. In one example, the values $\epsilon$ is 200, $\alpha_1$ is 2, and $\alpha_2$ is 1. The filter can be initialized at time k=0 using the following formula:

$$\Delta BW_{filt}^{mod}(-1) = \Delta BW^{mod}(-2)$$

$$\Delta BW_{filt}^{mod}(-2) = \Delta BW^{mod}(-2) \qquad (15)$$

The modified weight change $\Delta BW^{mod}(k)$ filtered at step 514 at sample instant k can be sent to step 504 to calculate the average of weight change $\Delta BW_{avg}(k+1)$ using equation (10) at the next sample instant k+1.

Eventually, the estimated batch fill rate 242 at sample instant k (FR(k)) in units of lbs/hour is calculated using the following formula at step 516:

$$FR(k)=-3600\Delta BW_{filt}^{mod}(k) \tag{16}$$

Example methods may provide an actual batch fill rate 244 with a desirably low standard deviation. In one example, the standard deviation can be measured as a relative change of the actual batch fill rate with respect to the weight of the batch within the holding bin 116 over time. For example, a relative standard deviation of the actual batch fill rate 244 can be less than 2.32% of the weight of the batch material within the holding bin 116. In another example, the relative standard deviation of the actual batch fill rate 244 can be less than about 1.94% of the weight of the batch material within the holding bin. In still another example, the relative standard deviation of the actual batch fill rate 244 can be less than about 1.67% of the weight of the batch material within the holding bin, for example about 1.61% of the weight of the batch material within the holding bin. Example methods herein can be used with a wide range of processes with various amounts of batch material within the holding bin 116. For instance, if the holding bin includes 1800 pounds of batch material, a standard deviation of the actual batch fill rate 244 can be less than 41.8 lbs/hr. In another example, the standard deviation of the batch fill rate 244 is less than about 35 lbs/hr. In still another example, the standard deviation of the actual batch fill rate 244 is less than about 30 lbs/hr, for example, 28.9 lbs/hr.

In addition or alternatively, example methods may provide a level of molten glass 124 with a desirably low standard deviation. In one example, the standard deviation can be measured as a relative change in the level of molten glass with respect to an average level of molten glass. For example, a relative standard deviation for the level of molten glass 124 can be less than 0.16% of the average level of molten glass. In another example, the relative standard deviation of the actual batch fill rate 244 is less than about 0.12% of the average level of molten glass. In still another example, the relative standard deviation of the actual batch fill rate 244 is less than about 0.058% of the average level of molten glass, for example about 0.036% of the average level of molten glass. Example methods herein can be used with a wide range of processes with various average levels of molten glass. For instance, if the average level of molten glass is 33.5 inches with in the glass melter 112, the standard deviation of the level of molten glass 124 can be less than 0.54 inches. In another example, the standard deviation of the actual batch fill rate 244 can be less than about 0.04 inches. In still another example, the standard deviation of the actual batch fill rate 244 can be less than about 0.02 inches, for example, 0.012 inches.

In another example embodiment, there may be multiple batch deliver devices and holding bins and therefore multiple estimated and actual batch fill rates, and thus the fill rate control may be setup in different configurations. For instance, multiple batch fill rate controller can be designed, one for each batch deliver device, and the predetermined batch fill rate is divided up among each batch fill rate controller. The design of each batch fill rate controller should be based upon the response of the corresponding estimated batch fill rate to the corresponding batch deliver device's speed command. Alternatively, one batch fill rate controller can be designed for every batch deliver device using the total predetermined batch fill rate and total actual fill rate, and the resulting speed command may be distributed appropriately among each batch fill rate controller. In this case, the controller design should be based on the response of the total actual fill rate to the speed command.

The present invention can work for any process where a tight fluid level and raw batch fill rate control is required, and where no direct batch fill rate measurement is feasible. Providing tight fluid level and raw batch fill rate can enhance the quality of the glass sheets formed by the apparatus. Moreover, reducing glass level and fill rate variability may also reduce adverse interaction with thermal, electrical, and compositional aspects of the glass melting process. Thus, tighter fill rate and level control can improve melting stability, improve uniformity of molten glass, and reduce applied power variation. In addition, reducing glass level variation can also reduce inclusions that may otherwise be introduced into the glass melt by significant glass level variation. Still further, reducing fill rate variation may reduce the load on the flowbridge.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method of making a glass material comprising the step of:
controlling an actual batch fill rate of batch material entering a glass melter comprising the steps of estimating a batch fill rate of batch material entering the glass melter at a location upstream from the glass melter, and controlling the actual batch fill rate based on a comparison between a predetermined batch fill rate of batch material entering the glass melter and the estimated batch fill rate at the location upstream from the glass melter.

2. The method of claim 1, wherein the step of controlling the actual batch fill rate includes using a close-loop control to cause the actual batch fill rate to approach the predetermined batch fill rate.

3. The method of claim 1, wherein the predetermined batch fill rate is based on a difference between a predetermined level of molten glass and a monitored level of molten glass within the glass melter.

4. The method of claim 3, wherein the step of controlling the actual batch fill rate includes using a close-loop control to cause an actual level of molten glass to approach the predetermined level of molten glass.

5. The method of claim 1, wherein the step of estimating the batch fill rate includes determining a characteristic change in a quantity of batch material over time.

6. The method of claim 5, further comprising the step of:
adding additional batch material to the quantity of batch material over a period of time; and
compensating for the additional batch material when determining the characteristic change over the period of time.

7. The method of claim 5, wherein the characteristic change includes a weight change.

8. The method of claim 7, wherein the step of estimating includes calculating the weight change using a numerical differentiation technique.

9. The method of claim 7, wherein the step of estimating includes the step of pre-filtering data corresponding to a weight of the quantity of batch material.

10. The method of claim 7, further comprising the steps of:
adding additional batch material to the quantity of batch material over a period of time; and
compensating for the additional batch material when determining the weight change over the period of time.

11. The method of claim 10, wherein the step of compensating includes substantially masking the additional batch material with historical weight change data.

12. The method of claim 11, wherein the step of masking is triggered by a formula:

$$||\Delta BW(k)|-|\Delta BW_{avg}(k)||\geq \Delta BW_{threshold}$$

where $\Delta BW_{threshold}$ is a constant, $\Delta BW(k)$ is batch weight change at a sample instant, k is a sample instant, and $\Delta BW_{avg}(k)$ is a running average of the batch weight change.

13. The method of claim 10, wherein the step of compensating includes subtracting a weight of the additional batch material.

14. The method of claim 10, further comprising the step of post-filtering data corresponding to the weight change over the period of time.

15. The method of claim 1, wherein the standard deviation of the actual batch fill rate is less than about 35 lbs/hr.

16. A method of controlling a level of molten glass within a glass melter comprising the steps of:
monitoring a level of molten glass within the glass melter;
calculating a predetermined batch fill rate for the glass melter based on a difference between a predetermined level of molten glass and the monitored level of molten glass;
estimating a batch fill rate of batch material entering the glass melter by determining a characteristic change in a quantity of batch material over time at a location upstream from the glass melter; and
controlling an actual batch fill rate of batch material entering the glass melter based on a comparison between the predetermined batch fill rate of batch material entering the glass melter and the estimated batch fill rate at the location upstream from the glass melter.

17. The method of claim 16, wherein the characteristic change includes a weight change.

18. The method of claim 16, further comprising the step of:
adding additional batch material to the quantity of batch material over a period of time; and
substantially masking for the additional batch material when determining the characteristic change over the period of time.

19. The method of claim 16, wherein the standard deviation of the level of molten glass is less than about 0.04 inches.

* * * * *